UNITED STATES PATENT OFFICE.

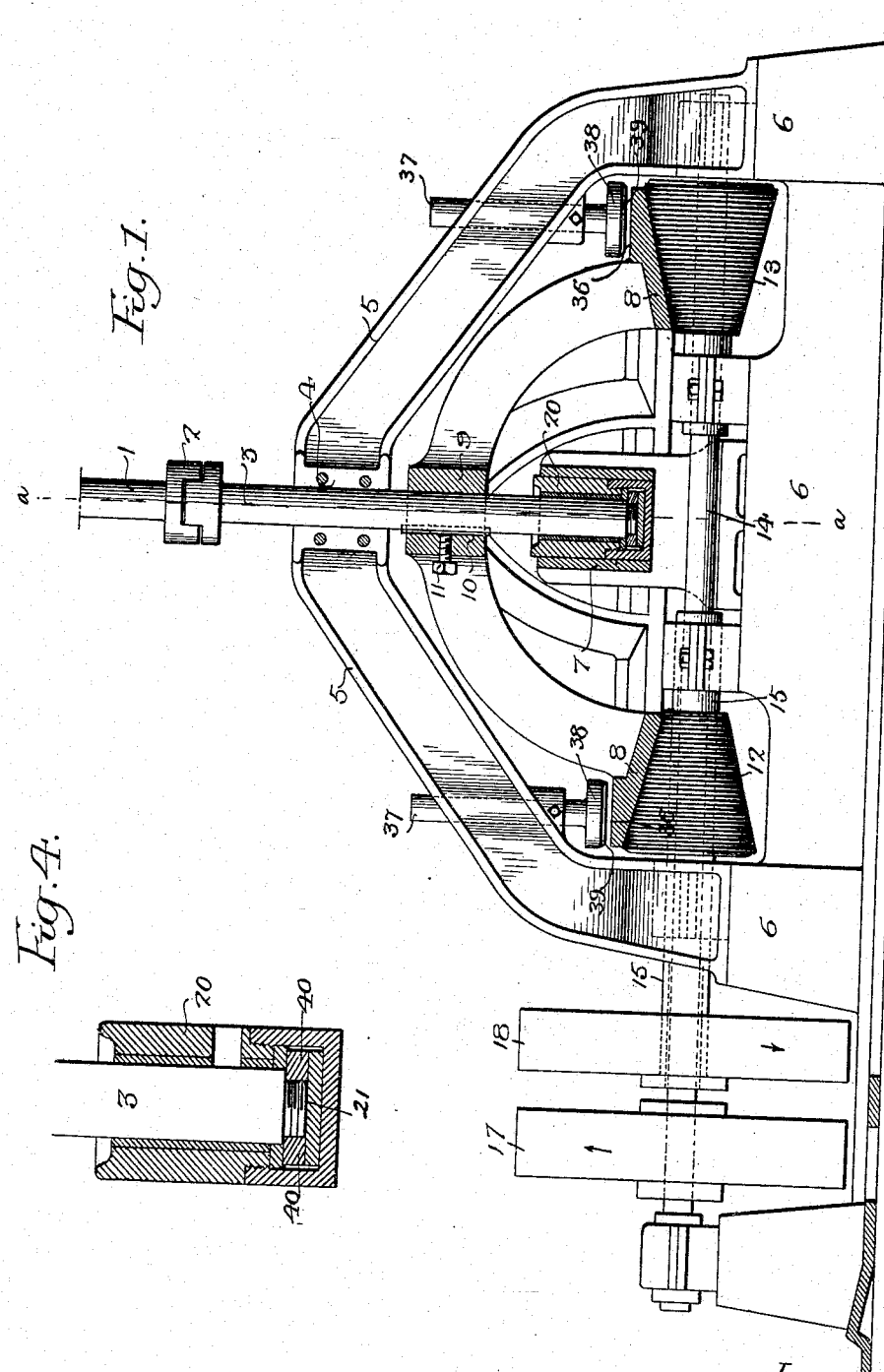

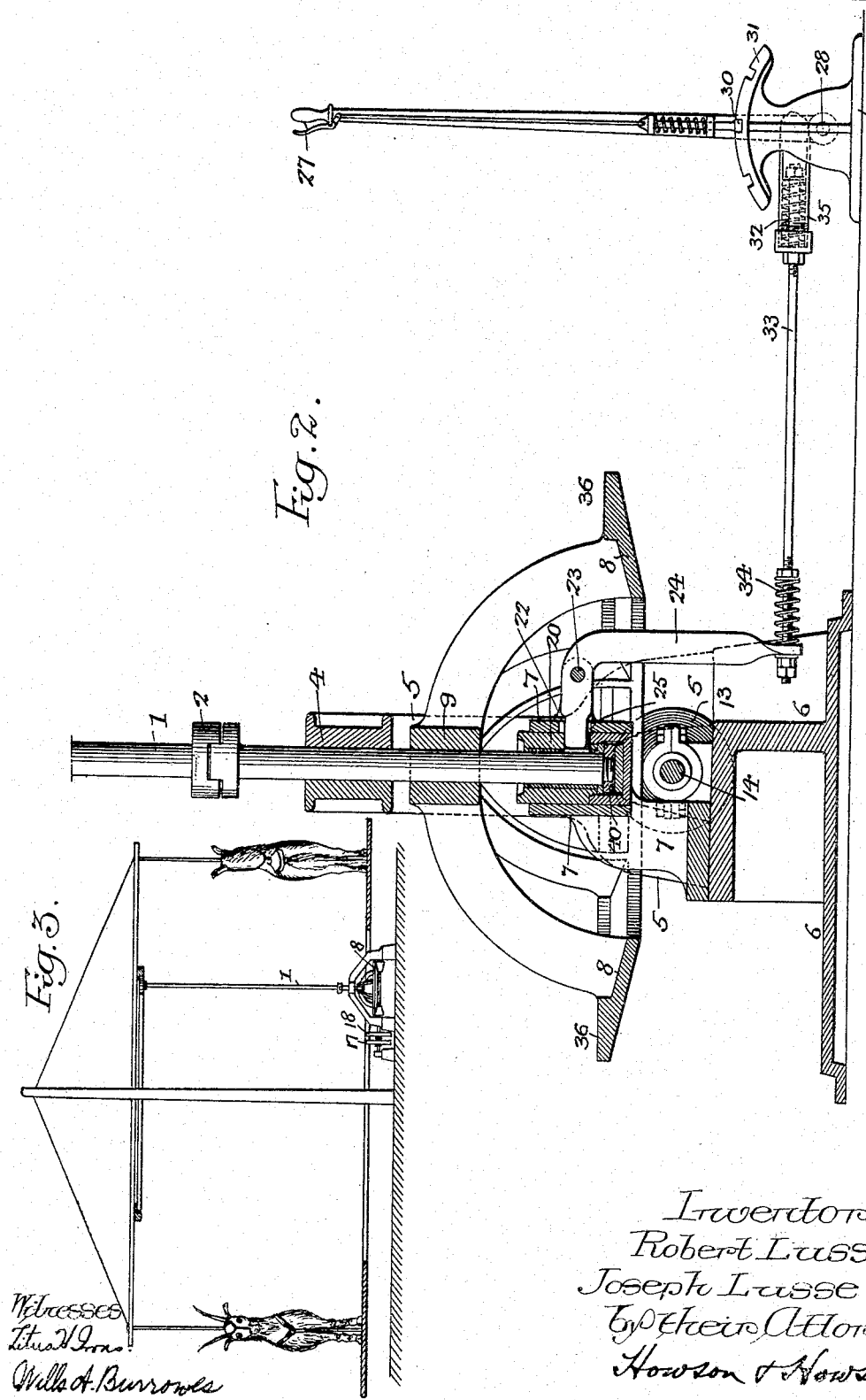

ROBERT LUSSE AND JOSEPH LUSSE, OF PHILADELPHIA, PENNSYLVANIA.

FRICTION DRIVING MECHANISM.

939,046. Specification of Letters Patent. Patented Nov. 2, 1909.

Application filed August 17, 1908. Serial No. 448,843.

*To all whom it may concern:*

Be it known that we, ROBERT LUSSE and JOSEPH LUSSE, citizens of the United States, and residents of Philadelphia, Pennsylvania, have invented certain Improvements in Friction Driving Mechanism, of which the following is a specification.

Our invention relates to friction driving mechanism, and the object of our invention is to provide an improved form of such mechanism which has been applied particularly for the purpose of driving carousels, although, as will be understood, it is available for any other work capable of being actuated by such form of driving mechanism.

Our invention is fully shown in the accompanying drawings, in which:

Figure 1, is a front elevation, partly in section, of the apparatus forming the subject of our invention; Fig. 2, is a sectional view of the same, taken on the line *a—a*, Fig. 1; Fig. 3, is a diagrammatic view of a carousel driven by such mechanism, and Fig. 4, is a sectional view illustrating a detail of our invention.

1 represents the driving shaft of the carousel which is geared to the moving portion of the latter in any suitable manner, the carousel not being shown. This shaft is connected by means of a suitable clutch 2 with a shaft 3 mounted in a suitable vertical bearing 4 carried by an A-frame 5 mounted upon and suitably secured to a base 6. The shaft 3 is also provided with a step bearing 7, and means are provided for raising and lowering said bearing, and with it said shaft. Carried by this shaft is a beveled disk 8; the hub 9 of which is keyed at 10 to the shaft; such key being preferably secured by a set screw 11, and the movement of said wheel tends to drive the shaft 3, from which movement is imparted through the clutch 2 to the shaft 1.

For the purpose of driving the disk 8, we provide friction cones 12 and 13; the cone 13 being mounted upon a shaft 14, while the cone 12 is mounted upon the sleeve 15 inclosing said shaft; said sleeve being mounted in suitable bearings whereby it may rotate independently of the shaft, and said shaft and sleeve are driven by the pulleys 17 and 18, one of which moves in one direction, and the other in the opposite direction so that the movement of said cones will be such as to drive the disk 8 in one direction at all times.

In order to raise or lower the disk 8, we provide the means shown in the enlarged view, Fig. 3, consisting of a box 20 suitably supported on the base and carrying a step bearing 21 for the end of the shaft 3. Carried by this box are two lugs 22 in which is pivoted at 23 a lever 24, the short arm of said lever extending through a slot 25 in the box and entering a recess in the bearing, while the long arm of said lever 24 is connected to suitable operating mechanism. Under normal conditions, the disk would tend to lower onto the cones, and means must be provided for lifting the same when it is desired to stop the mechanism. The lever 24 is actuated by a hand lever 27, pivoted at 28 to a suitable base 29 and having a movable pawl 30 whereby it may be held in engagement with the notches of a suitable fixed rack segment 31. The hand lever 27 is connected to the lever 24 by means of a tubular link 32, which link carries a rod 33 and springs 34 and 35, which are held in place by the several nuts; such springs forming cushions and serving to prevent excessive movement of the disk when the hand lever is moved in either direction so as to effect a gradual start and stoppage of the disk with consequent effect upon the carousel.

In order to provide stopping means for the disk 8, we provide the latter with a horizontal braking surface 36, and in the A-frame we mount spindles 37 having shoes 38 with wooden engaging blocks 39 for contact with said braking surface 36 of the disk. When the hand lever is moved in the proper direction, the disk is raised into engagement with these fixed shoes, and pressure exerted by such movement and controlled by the operator tends to stop the disk and with it the carousel. In the reverse action, pressure of the hand lever in the opposite direction holds said disk against the cones until motion of disk is started.

The lower end of the vertical shaft carries a hard metal disk 40, preferably of steel, above and below which is mounted washers of softer metal, phosphor-bronze for instance. This construction provides a satisfactory bearing operating without chatter or noise.

We claim:

1. The combination, in friction driving mechanism, of a vertical shaft, a bevel disk carried thereby, friction cones in engagement with said bevel disk whereby the latter may be driven, means for driving said cones, a step bearing for said vertical shaft, a lever in engagement with said step bearing, a hand lever, and a connection between said levers whereby the operation of the hand lever will serve to raise or lower the disk, said connection comprising cushion springs to prevent excessive movement of said disk.

2. In friction driving mechanism, the combination of a vertically mounted shaft, a bevel disk carried thereby, a pair of cones in engagement with the disk for driving the same, means for driving said cones, and means for raising and lowering said disk with respect to said cones including means for cushioning the engagement of the disk with the cones.

3. In friction driving mechanism, the combination of a vertically mounted shaft, a bevel disk carried thereby, a pair of cones in engagement with the disk for driving the same, means for driving said cones, said disk having a braking surface opposite the surface engaged by the cones, braking means for engagement with said braking surface, and means for raising and lowering said disk with respect to said cones and braking means including means for cushioning the engagement of the disk with the cones and braking surface.

In testimony whereof, we have signed our names to this specification, in the presence of two subscribing witnesses.

ROBERT LUSSE.
JOSEPH LUSSE.

Witnesses:
MURRAY C. BOYER,
JOS. H. KLEIN.